No. 847,826. PATENTED MAR. 19, 1907.
H. M. ROLLINS & A. J. NEFF.
TRUCK FOR WOOD PRESERVING RETORTS.
APPLICATION FILED NOV. 24, 1905.

WITNESSES:

INVENTORS
Henry M. Rollins
Asa J. Neff
BY
ATTORNEYS

UNITED STATES PATENT OFFICE.

HENRY M. ROLLINS AND ASA J. NEFF, OF HOUSTON, TEXAS.

TRUCK FOR WOOD-PRESERVING RETORTS.

No. 847,826.      Specification of Letters Patent.      Patented March 19, 1907.

Application filed November 24, 1905. Serial No. 288,900.

*To all whom it may concern:*

Be it known that we, HENRY M. ROLLINS and ASA J. NEFF, both citizens of the United States, and residents of Houston, in the county of Harris and State of Texas, have invented a new and Improved Truck for Wood-Preserving Retorts, of which the following is a full, clear, and exact description.

Our invention relates to a truck specially adapted for carrying articles which are to be moved on the truck into retorts, especially those constructed in cylindrical form. Retorts of this character usually have tracks upon which a truck is designed to run, the truck supporting the wood to be preserved and remaining in the retort while the preservative is being applied. Ordinary trucks, however, are of such form that much space is wasted, and it is obviously desirable that as nearly as possible the entire capacity of the retort be utilized in each operation.

It is the principal object of our invention, therefore, to so construct a truck for this purpose as to permit the loading of a greater amount of wood upon it than has heretofore been the case, and especially to provide for filling practically the entire space within the retort with wood or other articles to be treated.

A further object of the invention is to provide for preventing the lifting of the truck from the tracks when the liquid preservative is introduced into the retort.

Reference is to be had to the accompanying drawings, forming a part of this specification, in which similar characters of reference indicate corresponding parts in all the figures.

Figure 1:
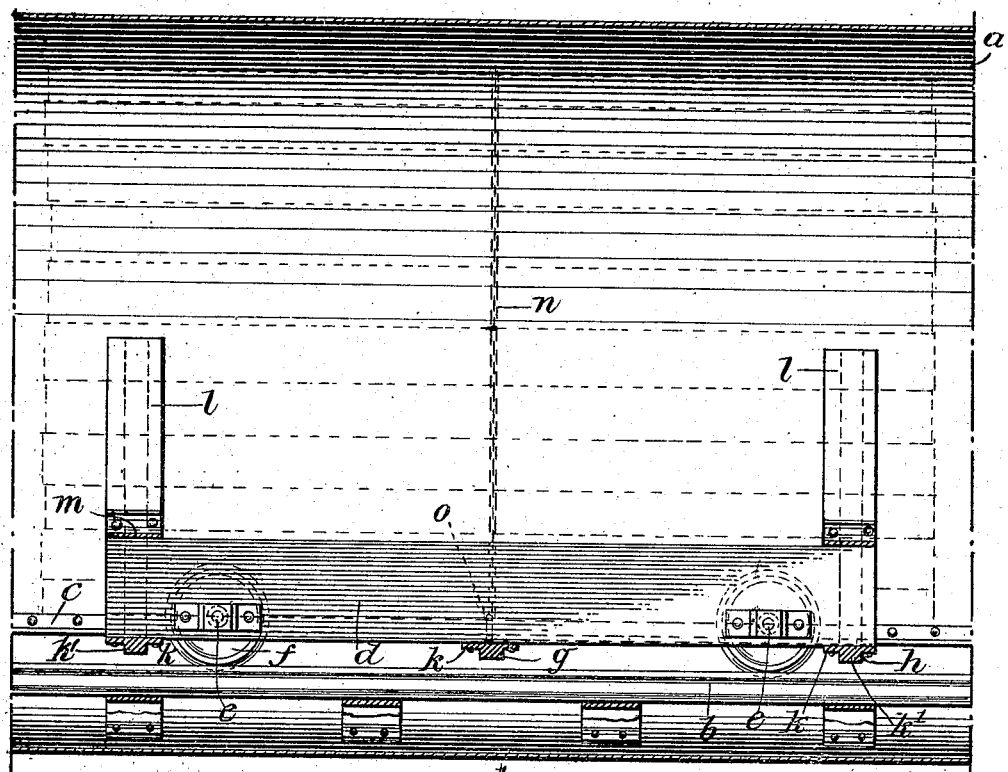
Figure 2:
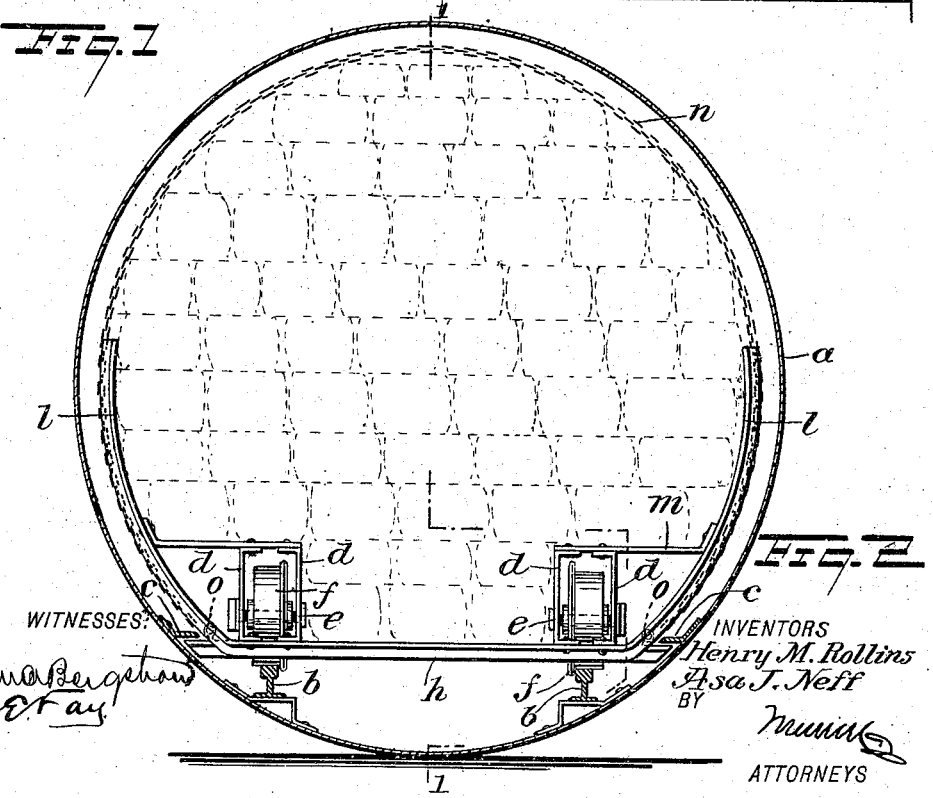

Figure 1 is a sectional view of a wood-preserving retort with a preferred form of our improved truck thereon, taken on the line 1 1 of Fig. 2; and Fig. 2 is a transverse sectional view of the same, taken at the end of Fig. 1.

We have illustrated a cylindrical wood-preserving retort $a$ of the usual form. This retort is provided with tracks $b$ and with a cleat $c$, located along its opposite sides near the bottom. Upon the track runs a truck, which instead of being provided with the usual axle $s$ has a pair of plates $d$ on each side, having bearings for supporting four pins $e$, which carry wheels $f$. The wheels therefore are mounted upon the lower side of the truck in such a way as to take up very little space, and the axle being done away with the space usually occupied by it can be used for carrying ties or other objects to be treated. On this account the main floor of the truck is lowered to a point near the bottom of the wheels. This floor is constructed in the present instance of a central cross-piece $g$ and two side cross-pieces $h$. These cross-pieces are formed with flanges $k$ and with a downwardly-extending portion $k'$ at the center to afford stiffness and increase the tensile strength in comparison with the weight of the material employed for the cross-pieces which support the load.

The central cross-piece projects outwardly at each end a sufficient distance to pass under the cleats $c$. This is for the purpose of preventing the rising of the vehicle in the retort when the latter is filled with liquid. The end cross-pieces are provided with curved extensions $l$, which conform substantially with the curvature of the retort and which project upwardly a sufficient distance to securely support a load and prevent it from being crushed outwardly by the portion of the load supported above. The projections $l$ are preferably secured to the plates $d$ by horizontal bars $m$, which also assist in supporting the load.

The parts last described are located transversely with respect to the length of the truck, and they may be secured together by longitudinal bars of any desired number and location. Plates $d$ serve for this purpose, and it is not absolutely necessary to add other longitudinal bars or plates when articles like railway-ties, which extend the full length of the truck, are intended to be treated. Such articles will rest upon the transverse pieces $g$ and $h$ and the plates $m$ and will be held securely in position at the sides by the projections $l$.

In order to secure the load firmly in position, a chain $n$ or the like is preferably passed around the load, being secured to the body of the vehicle by means of eyes $o$.

It will be seen that by constructing a truck in accordance with the principles set forth above practically all of the space within the retort can be utilized for holding the articles to be treated, and a great economy is effected in the operation thereof. It will be readily understood that if ten per cent. of the space within the retort were wasted upon each operation the capacity would be diminished accordingly and the expense of treating the materials increased. The importance of providing means whereby this expense and the extra time involved can be saved will be readily understood.

Having thus described our invention, we claim—

1. In a wood-preserving plant, the combination with a retort provided with rails and with cleats upon the opposite sides thereof adjacent to the rails, of a car comprising cross-bars, one of said cross-bars having its ends extended to engage beneath the cleats, pairs of upwardly-extending side plates secured to the cross-bars near the ends thereof, wheels journaled between the members of each pair, and side extensions secured to the cross-bars and extending upwardly therefrom, said extensions being shaped to conform with the walls of the retort.

2. In a wood-preserving plant, the combination with a retort provided with rails and with cleats on the opposite sides thereof adjacent to the rails, of a car comprising cross-bars, one of said cross-bars having its ends extended to engage beneath the cleats, pairs of upwardly-extending side plates secured to the cross-bars near the ends thereof, and wheels journaled between the members of each pair.

In testimony whereof we have signed our names to this specification in the presence of two subscribing witnesses.

HENRY M. ROLLINS.
    ASA J. NEFF.

Witnesses:
 JNO. J. MAHONE,
 FRANK W. NORRIS.